United States Patent [19]

Trepka

[11] 4,086,406

[45] Apr. 25, 1978

[54] COUPLING LITHIUM-INITIATED POLYMER WITH A VINYLHALOMETHYLARENE

[75] Inventor: William J. Trepka, Bartlesville, Okla.

[73] Assignee: Phillips Petroleum Company, Bartlesville, Okla.

[21] Appl. No.: 642,881

[22] Filed: Dec. 22, 1975

[51] Int. Cl.² ............................ C08F 8/04; C08F 8/26
[52] U.S. Cl. ...................................... 526/25; 260/879; 260/880 B; 526/20; 526/21; 526/26; 526/46; 526/182
[58] Field of Search .............. 260/880 B, 879; 526/46, 526/25, 26

[56] References Cited

U.S. PATENT DOCUMENTS

| | | | |
|---|---|---|---|
| 3,810,957 | 5/1974 | Lunk | 260/880 B X |
| 3,813,455 | 5/1974 | Saltman et al. | 260/879 |
| 3,817,957 | 6/1974 | Trepha | 260/94.7 HA X |
| 3,862,098 | 1/1975 | Milkovich et al. | 260/94.7 HA X |

*Primary Examiner*—William F. Hamrock

[57] ABSTRACT

Lithium-initiated polymers are coupled with a vinylhalomethylarene such as vinylbenzyl chloride. Maximum molecular weight is obtained at about one mol of coupling agent for two mols of polymerlithium, indicating a major amount of the coupling to be in the form of about two polymerlithium entities being joined to one coupling agent. Excellent stability indicates little formation of branched polymer through carbon-lithium bonding. Consequently, the coupled polymer can be hydrogenated successfully to give a high molecular weight ozone-stable product.

10 Claims, No Drawings

COUPLING LITHIUM-INITIATED POLYMER WITH A VINYLHALOMETHYLARENE

BACKGROUND OF THE INVENTION

This invention relates to producing polymer of increased molecular weight by reacting a lithium-initiated polymer with a coupling agent.

Many polymers of conjugated dienes synthesized employing organolithium initiators have a strong tendency to cold flow in the uncured state. For example, this tendency commonly occurs with polymers when their Mooney value is below 30 (ML-4 at 212° F.). A very attractive solution to this problem has been to couple two or more polymer molecules by reaction of the "living" or metal terminated polymer with a compound containing two or more sites capable of reacting with the carbon-lithium bond and adding to the carbon atom possessing this bond in the polymer. The resulting coupled polymer exhibits little or no tendency to cold flow, a very marked increase in Mooney, good processability and the absence of gel. Further, coupling of certain appropriate polymerlithium types can produce thermoplastic elastomers. For example, dichain coupling of block copolymers of type AB-Li wherein A is a block of monovinylarene and B is a block of acyclic conjugated diene yields a thermoplastic elastomer of structure ABBA or, broadly, ABA.

However, coupled polymers differ in their stability. As an example, it has been found that some coupled polymers tend to suffer cleavage, at least in part, back to the parent or uncoupled polymer when said coupled polymers are subjected to catalytic hydrogenation. This tendency can be a serious limitation when it is desired to hydrogenate a polymer to improve its environmental stability, e.g., its stability to ozone. However, this tendency is not exhibited by coupled polymers that became coupled through the formation of carbon-carbon bonds.

SUMMARY OF THE INVENTION

It is an object of this invention to provide lithium-initiated polymer of increased molecular weight;

It is a further object of this invention to provide a rubbery polymer having high green tensile strength;

It is yet a further object of this invention to provide a stable polymer which is resistant to cleavage;

It is still yet another object of this invention to provide a polymer which is susceptible to hydrogenation to provide an ozone-resistant final product; and It is still yet a further object of this invention to produce essentially all carbon to carbon bonding on coupling.

In accordance with this invention, lithium-initiated polymer is coupled with 0.6 to 1.4 equivalents of a vinylhalomethylarene.

DESCRIPTION OF THE PREFERRED EMBODIMENTS

This invention provides a coupling agent which couples polymerlithium through the formation of carbon-carbon bonds. Coupled polymers formed through the use of vinylhalomethylarene such as vinylbenzyl chloride hydrogenate readily and without apparent uncoupling to yield hydrogenated derivative polymers that possess excellent ozone resistance.

Monomers which can be employed in the synthesis of polymerlithiums for coupling in accordance with this invention are conjugated dienes, vinylarenes or mixtures of conjugated dienes and vinylarenes. The invention is of particular value in the production of rubbery diene homopolymers or copolymers containing 50–75 weight percent diene and 50–25 weight percent vinylarene. The conjugated dienes are ordinarily acyclic conjugated dienes that contain from 4 to 12 carbon atoms per molecule and those containing from 4 to 8 carbon atoms are preferred. Examples of such include 1,3-butadiene, isoprene, 2,3-dimethyl-1,3-butadiene, piperylene, 3-butyl-1,3-octadiene, 2-phenyl-1,3-butadiene and the like. The vinylarenes are ordinarily monovinylarenes and examples include styrene, 1-vinylnaphthalene, 2-vinylnaphthalene, and the alkyl, cycloalkyl, aryl, alkaryl, and aralkyl derivatives thereof in which the total number of carbon atoms in the combined substituents is generally not greater than 12. Further examples of such vinylarenes include 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene and the like. The conjugated dienes and the vinylarenes can be polymerized alone or in admixture to form homopolymers or copolymers. Monomers which are preferred for the practice of this invention are 1,3-butadiene and styrene. The preferred polymers are those in which the conjugated dienes are present in a major amount.

The polymers are prepared by contacting the monomer or monomers with an organomonometal compound under polymerization conditions. By organometal is meant a hydrocarbon compound of an alkali metal. Amyl sodium, for instance, can be used. However, organolithium compounds are greatly preferred and the subsequent description is in terms of this preferred class of initiators. The preferred class of these compounds can be represented by the formula RLi wherein R is a hydrocarbon radical selected from the group consisting of alkyl, cycloalkyl, and aromatic radicals containing from 1 to 20 carbon atoms, although higher molecular weight organomonolithium initiators can be employed. Examples of these initiators include methyllithium, n-butyllithium, sec-butyllithium, n-dodecyllithium, phenyllithium, naphthyllithium, p-tolyllithium, cyclohexyllithium, eicosyllithium and the like.

The amount of initiator employed can vary depending upon the desired molecular weight of the polymerlithium. A commonly employed and generally useful range of initiator level is from about 0.1 to 100 millimoles per 100 g of monomer.

The polymerization is normally carried out at a temperature in the range between −100 and +150° C., preferably between 25° and 100° C. A diluent can be used such as the hydrocarbons exemplified by benzene, toluene, cyclohexane, isooctane, and the like. These diluents are normally paraffins, cycloparaffins, or aromatic hydrocarbons or mixtures thereof containing from 4 to 10 carbon atoms per molecule. The resulting polymer contains a very high percentage of molecules in which a lithium atom is positioned at one end. Impurities present such as water, alcohols, oxygen and carbon dioxide will tend to reduce the amount of such polymerlithium formed and it is therefore advisable to rigorously exclude these and other potential impurities from the polymerization zone.

By appropriate techniques known in the art, it is possible to produce a variety of polymer types suitable for use in accordance with this invention. These polymer types include diene homopolymers, random copolymers, block copolymers and tapered block copolymers.

At the conclusion of the polymerization, the vinylhalomethylarene coupling agent is added to the unquenched reaction mixture. This agent must be added before any material such as water, acid or alcohol is added to inactivate and/or remove the lithium atoms present in the polymer. The temperature employed for this reaction can vary broadly and is conveniently the same or nearly the same temperature as employed during polymerization. Ordinarily, the coupling reaction occurs as soon as the reactants are combined and requires a total reaction period in the range of about 1 minute to about 1 hour although longer reaction periods can be employed when lower temperatures are involved.

The vinylhalomethylarene coupling agents react with polymerlithium on the basis of about one mol of vinylhalomethylarene per 2 mols of polymerlithium. Generally, the amount of vinylhalomethylarene employed is in the range of 0.6 to 1.4 equivalents based upon the amount of lithium, or other metal if an organometal other than an organolithium is used, present in the polymer. A preferred range is 0.7 to 1.3 equivalents of vinylhalomethylarene per equivalent of polymerlithium. One equivalent of vinylhalomethylarene is the optimum amount for achieving the desired complete conversion of both polymerlithium and coupling agent. As the above discussion indicates, one equivalent of the vinylhalomethylarene is one mol per two mols of lithium in the polymer. Further, since essentially all of the lithium introduced into the reaction ends up as a single lithium atom at one end only of a polymer chain, the mols of polymerlithium prior to coupling is essentially the same as the mols of organolithium introduced. Thus 0.6 to 1.4 equivalents of vinylmethylarene based on the metal in the polymer is essentially the same as 0.6 to 1.4 based on the organometal introduced as 0.6 to 1.4 based on the moles of polymermetal.

The mode of addition of the coupling agent can be, alternatively, batchwise, incremental, continuous, or a combination thereof, a rapid, convenient and effective coupling procedure to insure complete conversion of polymerlithium with a maximum degree of coupling has been found to consist of initially added coupling agent batchwise in 75 percent of the stoichiometric requirement followed by adding 50 percent of the stoichiometric requirement on a continuous basis.

The vinylhalomethylarene coupling agents which are employed in accordance with this invention are described by the generic formula

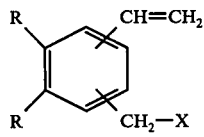

wherein X is selected from chlorine, bromine or iodine; with the halogenated alkyl group —CH$_2$X being alternatively at ring positions 3 or 4, i.e. meta or para to the vinyl group; the R's can be same or different and can be hydrogen, methyl or ethyl or the R's can be linked together to comprise a four carbon atom chain thereby providing a fused ring. Examples of the vinylhalomethylarenes suitable for use in this invention include: p-vinylbenzyl chloride (4-chloromethylstyrene), m-vinylbenzyl chloride (3-chloromethylstyrene), 4-bromomethylstyrene, 3-iodomethylstyrene, 4-chloromethyl-2,3-dimethylstyrene, 3-iodomethyl-5-ethylstyrene, 1-vinyl-4-chloromethylnaphthalene, and the like. Additionally, fused ring compounds of the 2-vinyl-4-haloalkyl structure, e.g., 2-vinyl-4-chloromethylnaphthalene, can also be employed.

The polymers coupled in accordance with this invention can be hydrogenated to effectively remove the olefinic unsaturation with or without removing substantial degrees of aromatic unsaturation. Hydrogenation can be effected in the presence of a variety of catalysts of either heterogeneous or homogeneous type. Examples of suitable heterogeneous catalyst systems include nickel on kieselguhr, Raney nickel, copper chromite, molybdenum sulfide, and finely divided platinum or other noble metals on a carrier. Homogeneous catalysts are preferred, however, and the latter can be prepared by reducing a cobalt, nickel or iron carboxylate or alkoxide with an aluminum alkyl compound. An example of a preferred, homogeneous catalyst is that formed through the reduction of nickel octoate by triethylaluminum. The polymer, preferably in solution in an inert solvent, is contacted with the catalyst under conditions which include temperatures in the range of about 0° to 250° C. and pressurization with hydrogen up to a total pressure of about 1000 psig. The reaction time can vary from 1 minute to 25 hours or more. Preferred conditions involve temperatures of 10° to 200° C., preferably 20° to 100° C., pressures of 10 to 500 psig and reaction times of about 10 minutes to 10 hours. When treating the polymer in solution, the pressure is usually that sufficient to maintain the reaction mixture substantially in the liquid phase. Upon the effective completion of the hydrogenation reaction, the hydrogenated polymer can be isolated by conventional techniques. For example, the catalyst components can be converted to water soluble salts and washed from the polymer solution. An antioxidant can be added if desired followed by coagulation of the polymer, filtration or decantation to isolate the polymer and, finally, removal of solvent traces under reduced pressure.

Compounding ingredients, such as fillers, dyes, pigments, softeners, reinforcing agents, and the like, can be used in compounding operations.

The polymers of this invention can be used in the fabrication of hoses, belting, extruded and molded goods for diverse applications including those in the building construction, automotive, medical and household article fields.

In the following illustrative examples, the polymerizations and batch coupling reactions were all carried out by conventional techniques in capped beverage bottles under anhydrous conditions with the exclusion of air and other deleterious agents. By the term batch coupling, illustrated in certain of the runs shown below, is meant the addition of the coupling agent in a single quantity or batch to the polymerlithium following completion of polymerization. Also illustrated in certain other of the runs shown below is the alternative mode of adding the coupling agent in a combination batch-and-continuous manner, employing a one-gallon stirred reactor fitted with a syringe pump, whereby 75 percent of the stoichiometric requirement of coupling agent is added batchwise followed by the addition of 50 percent of stoichiometric requirement of the coupling agent in a continuous manner over a period of a few minutes, for instance a 5-minute period. The resulting excess coupling agent assures completeness of reaction. For convenience, this combination batch-and-continuous addition mode can be referred to, for the purposes of the following examples as incremental addition of coupling agent.

Recipe-continued

| | |
|---|---|
| Reaction temperature, ° C. | 70 |

(a)Parts by weight per hundred parts by weight of monomer.
(b)Gram millimoles per hundred grams of monomer.
(c)A mixture of the meta (60%) and para (40%) isomers.

TABLE I

| Run No. | VBC(a) mhm(b) | $M_w/M_n$ (Thous.)(c) | H.I.(d) | Degree of Coupling(e) | Coupling Effic.,%(f) | Green Tensile, psi(h) | Mooney, MS-4/ 280° F.(i) | Melt Flow(j) |
|---|---|---|---|---|---|---|---|---|
| 1 | 0 | 61/54 | 1.13 | — | — | 0 | 5 | xsv(k) |
| 2 | 2.0 | 87/68 | 1.28 | 1.79 | 50 | 3180 | 36 | 13.1 |
| 3 | 1.0 | 146/103 | 1.42 | 2.15 | 90 | 3760 | 54 | 6.2 |
| 4 | 0.62 | 129/93 | 1.39 | 2.08 | 60 est.(g) | 3130 | 44 | 19.9 |
| 5 | 0.50 | 96/72 | 1.34 | 2.02 | 25 est. | 2010 | 30 | 51.9 |

(a)Vinylbenzyl chloride, mixed isomers (60% meta, 40% para).
(b)Gram millimoles per 100 g monomer.
(c)Weight average molecular weight, $M_w$, and number average molecular weight, $M_n$, were determined by gel permeation chromatography in accordance with the method of G. Kraus and C. J. Stacy, J. Poly. Sci. Symposium No. 43, 329–343 (1973).
(d)Heterogeneity index, the quotient: $M_w/M_n$.
(e)The degree of coupling, i.e., the average number of polymer chains per coupled polymer molecule, was determined by fixing the position of the gel permeation chromatograpy (GPC) peak of the parentmaterial, determining the molecular weight at this count from calibration tables, marking the positions of dichain, trichain (and, optionally, higher) products also determined from the calibration tables. The degree of coupling can then be estimated by interpolation of the now calibrated curve.
(f)Dichain coupling efficiency, i.e., the average percentage of available polymerlithium chains that become coupled, was calculated from the number average molecular weights by the following formula:

$$\text{Coupling efficiency} = 200 \left( \frac{M_n \text{ coupled polymer} - M_n \text{ uncoulped polymer}}{M_n \text{ coupled polymer}} \right).$$

(g)Estimated, estimation was necessary if there was GPC peak overlap between peaks for coupled and uncoupled polymer.
(h)ASTM D 412–66, "green" tensile referring to the absence of a prior curing step.
(i)ASTM D 1646–63.
(j)ASTM D 1238 modified, i.e., g/10 min. at 190° C./21.6 kg.
(k)Excessive, flow too great for conventional measurement.

EXAMPLE I

Synthesis of a 70 Bd/30 Sty Block Copolymer and Batch Coupling Thereof Employing Vinylbenzyl Chloride as the Coupling Agent Several runs were made to synthesize and to then batch couple a 70 butadiene/30 styrene block copolymer employing vinylbenzyl chloride as the coupling agent. These runs were made in accordance with the recipe set out hereinafter. The charge order was the order of listing for the components of the recipe. Following polymerization and subsequent batch coupling, one part by weight per hundred parts of 2,6-di-t-butyl-4-methylphenol was added in toluene-isopropyl alcohol solution, the polymers were coagulated in isopropyl alcohol and stripped free of volatiles at reduced pressure. The polymers thus obtained were evaluated and the results are shown below in Table I.

Recipe

| Step 1 | |
|---|---|
| Cyclohexane, phm(a) | 760 |
| Styrene, phm | 30 |
| Tetrahydrofuran, phm | 4 |
| n-Butyllithium (effective), mhm(b) | 2.0 |
| Polymerization Time, min. | 10 |
| Polymerization temperature, ° C. | 70 |
| Step 2 | |
| Butadiene, phm | 70 |
| Polymerization time, min. | 15 |
| Polymerization temperature, ° C. | 70 |
| Step 3 | |
| Vinylbenzyl chloride(c) (batch) | variable |
| Reaction time, min. | 10 |

As shown in Table I above, maximum values for molecular weight, heterogeneity index, degree of coupling, coupling efficiency, green tensile strength, Mooney viscosity, and a minimum melt flow value all occurred in Run 3 in coincidence with the combination of one mol of coupling agent with 2 mols of polymerlithium, i.e., Run 3 used 1 gram millimole of coupling agent per 100 grams monomer and all of the runs had 2 gram millimoles of lithium per 100 grams of monomer.

EXAMPLE II

Vinylbenzyl Chloride as a Branching Agent for a 75 Bd/30 Sty Random Copolymer Several runs were made employing vinylbenzyl chloride as a branching agent, i.e., as a comonomer, and several contrasting runs were also made employing vinylbenzyl chloride as a coupling agent. These runs were made in accordance with the following recipe. The polymers were isolated by the technique of Example I. The polymers thus obtained were evaluated and the results are shown in Table II.

Recipe

| | |
|---|---|
| Cyclohexane (Cy), phm | 750 |
| Butadiene (Bd), phm | 75 |
| Styrene (Sty), phm | 25 |
| Tetrahydrofuran (THF), phm | 1.5 |
| Vinylbenzyl chloride (VBC), phm | variable |
| n-Butyllithium (NBL) (Effective amount), mhm | 1.0 |
| Polymerization temperature, ° C. | 70 |
| Polymerization time | variable |

Charge order:
Initial - Cy, Bd, Sty, THF
A. Branching - VCB, NBL (1 hr., 70° C.)
B. Coupling - NBL (20 min., 70° C.), VBC (15 min., 70° C.)

TABLE II

| Run No. | VCB, mhm | Conv.,[a] wt. % | $M_w/M_n$ (thous.) | H.I. | Mooney, ML-4/212° F. | Degree of Coupling | Coupling Efficiency |
|---|---|---|---|---|---|---|---|
| A. VBC as a Branching Agent ||||||||
| 1 | 0 | 100 | 130/108 | 1.23 | 13 | — | — |
| 2 | 0.2 | 100 | 206/149 | 1.38 | 40 | — | — |
| 3 | 0.5 | 94.7 | 533/304 | 1.75 | 145 | — | — |
| 4 | 1.0 | 0 | —[b] | — | — | — | — |
| 5 | 2.0 | 0 | — | — | — | — | — |
| B. VBC as a Coupling Agent ||||||||
| 6 | 0.5 | 100 | — | — | 64 | 2.36 | >60% Est. |
| 7* | 0.67 | 100 | — | — | 2 | 1.76 | 40% Est. |
| 8 | 1.00 | 100 | — | — | 46 | 1.80 | 51% Est. |
| 9 | 2.00 | 100 | — | — | 48 | 1.80 | 51% Est. |

[a] Conversion of monomers to polymer.
[b] A dash denotes no determination was made.
*This run is not believed to be representative.

The effect of attempting to employ vinylbenzyl chloride as a comonomer, i.e., as a branching agent, is that it functions as a total polymerization poison at moderate concentrations.

EXAMPLE III

Vinylbenzyl Chloride Coupling of a 70 Bd/30 Sty Block Copolymer by Incremental Addition of the Coupling Agent Followed by Hydrogenation of the Coupled Polymer Two comparative runs were made employing vinylbenzyl chloride as a coupling agent for a 70 butadiene/30 styrene block copolymer. A small sample of each polymer was isolated by the polymer isolation method of Example I for evaluation as shown in Table III. The remainder of each polymer was coupled with vinylbenzyl chloride wherein batch coupling was employed in one run and incremental addition of the coupling agent was employed in the other run. These runs were made in accordance with the following recipe. The charge order was the order of listing components in the recipe. Following coupling, a sample of each coupled polymer was isolated by the polymer isolation method of Example I. Evaluation data relative to these coupled polymers appear in Table III. The remainder of each coupled polymer was then hydrogenated, and the hydrogenated polymers were then isolated by the polymer isolation method of Example I. Evaluation data relative to these hydrogenated, coupled polymers also appear in Table III.

The hydrogenations, carried out without addition of further diluent, were made employing a nickel hydrogenation catalyst which catalyst is formed by the triethylaluminum reduction of nickel octoate in a molar ratio of 2 triethylaluminum/1 nickel octanoate. The catalyst was employed at the level of 5 millimoles nickel per 100 grams rubber. The hydrogenations were carried out at approximately 50 psig hydrogen and 70° C. for 1 hour.

| Recipe | Run 1 (Batch) | Run 2 (Incremental) |
|---|---|---|
| Step 1 | | |
| Cyclohexane, phm | 760 | 760 |
| Tetrahydrofuran, phm | 4 | 4 |
| Styrene, phm | 30 | 30 |
| n-Butyllithium (effective), mhm | 2 | 2 |
| Polymerization temperature, ° C. | (a) | (a) |
| Polymerization time, min. | 5 | 5 |
| Step 2 | | |
| Butadiene, phm | 70 | 70 |
| Polymerization temperature, ° C. | (a) | (a) |
| Polymerization time, min. | peak temp. | peak temp. |
| | +2 min. | +2 min. |
| Step 3, Run 1 | | |
| Vinylbenzyl chloride (batch addition), mhm | 1.0 | 0.75 |
| Step 3, Run 2 | | |
| Vinylbenzyl chloride (continuous addition), mhm | | 0.50 |
| Reaction temperature, ° C. | | 70 |
| Reaction (addition) time, min. | | 5 |
| Step 4 | | |
| Reaction temperature, ° C. | 70 | 70 |
| Reaction time, min. | 10 | 10 |

(a) 70° C. initially and then reaction allowed to proceed adiabatically.

TABLE III

| | Run 1 (Batch) | Run 2 (Incremental) |
|---|---|---|
| Prior to coupling | | |
| $M_w/M_n$ (thous.) | 66/57 | 65/58 |
| H.I. | 1.14 | 1.13 |
| After coupling | | |
| $M_w/M_n$ (thous.) | 210/143 | 158/108 |
| H.I. | 1.46 | 1.47 |
| Degree of coupling | 2.1 | 2.2 |
| Coupling efficiency, % | >90 | 93 |
| MS-4 at 280° F. | 77 | 65 |
| Cold flow, mg/min[a] | 0 | 0 |
| Green tensile, psig | 2860 | 2790 |
| Melt flow, 21.6 Kg./190° C. | 0.93 | 1.51 |
| After hydrogenation | | |
| MS-4 at 280° F. | 115 | 100 |
| Melt flow, 21.6 Kg./190° C. | 0 | 0 |
| Ozone susceptibility[b] | 0 | 0 |

[a] Cold flow is measured by extruding the rubber through a 0.25 in. orifice at 3.5 psig at 50° C. After allowing 10 min. to reach steady state, the rate of extrusion is measured in milligrams per minute.
[b] Samples were clamped linearly in position of 10 percent elongation and exposed to 50 parts ozone per million air at 40° C. for 3 weeks. No cracks developed in the samples during this test, i.e., there was no evident susceptibility to attack by ozone.

As indicated by the above data, efficient coupling occurred to provide polymers possessing good green tensile, negligible cold flow, and excellent ozone resistance.

While this invention has been described in detail for the purpose of illustration, it is not to be construed as limited thereby but is intended to cover all changes and modifications within the spirit and scope thereof.

I claim:

1. A process for producing polymer of at least one monomer selected from the group consisting of conjugated dienes and vinylarenes by contacting said at least one monomer under polymerization conditions with an organolithium, the improvement comprising:

introducing at the conclusion of the resulting polymerization 0.6 to 1.4 equivalents based on the amount of metal in the polymer of a vinylhalomethylarene having the formula

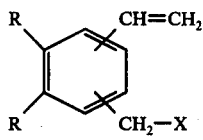

wherein X is selected from chlorine, bromine, or iodine, with the halogenated alkyl group —CH$_2$X being alternatively meta or para to the vinyl group,
the R's being the same or different, and being selected from the group consisting of hydrogen, methyl and ethyl or being linked together to comprise a 4-carbon atom chain, and
recovering the resulting coupled polymer.

2. The process according to claim 1 wherein said at least one monomer is 1,3-butadiene and styrene.

3. The method according to claim 1 wherein said at least one monomer is 1,3-butadiene.

4. The method according to claim 1 wherein said organolithium is n-butyllithium.

5. The method according to claim 1 wherein said vinylhalomethylarene is vinylbenzyl chloride.

6. The method according to claim 5 wherein said at least one monomer is selected from the group consisting of 1,3-butadiene and styrene and wherein said vinylhalomethylarene is introduced in an amount within the range of 0.7 to 1.3 equivalents based on said metal in said polymer.

7. The method according to claim 1 wherein said vinylhalomethylarene is introduced in an amount within the range of 0.7 to 1.3 equivalents based on said metal in said polymer.

8. The method according to claim 1 wherein said vinylhalomethylarene is introduced in an amount of about 1 equivalent based on said metal in said polymer.

9. The method according to claim 1 wherein a portion of said vinylhalomethylarene is introduced as a batch and the remaining portion of said vinylhalomethylarene is introduced in a continuous manner over a period of a few minutes.

10. The method according to claim 1 wherein the recovered polymer is subjected to a subsequent hydrogenation treatment wherein said at least one monomer is selected from 1,3-butadiene and styrene, and wherein said organolithium is n-butyllithium.

* * * * *